United States Patent [19]

Scott

[11] Patent Number: 4,920,300

[45] Date of Patent: Apr. 24, 1990

[54] POWER SUPPLY

[75] Inventor: Mark A. Scott, Yiewsley, England

[73] Assignee: Thorn EMI plc, London, England

[21] Appl. No.: 192,636

[22] Filed: May 11, 1988

[30] Foreign Application Priority Data

May 12, 1987 [GB] United Kingdom ............ 8711131

[51] Int. Cl.$^5$ ............................................. H05B 41/24
[52] U.S. Cl. ............................. 315/209 R; 315/226; 315/307; 315/DIG. 5
[58] Field of Search ............... 315/209 R, 224, 226, 315/246, 291, 307, DIG. 5, DIG. 7

[56] References Cited

U.S. PATENT DOCUMENTS

| | | |
|---|---|---|
| 3,506,876 | 4/1970 | Antonich . |
| 3,719,857 | 3/1973 | Sharp . |
| 4,064,414 | 12/1977 | Bergeson et al. ............ 315/291 X |
| 4,373,146 | 2/1983 | Bonazoli et al. ............ 315/209 R |
| 4,705,991 | 11/1987 | Ganser et al. ............ 315/209 R |

FOREIGN PATENT DOCUMENTS 1276522 6/1972 United Kingdom .

Primary Examiner—Eugene R. Laroche
Assistant Examiner—Robert J. Pascal
Attorney, Agent, or Firm—Fleit, Jacobson, Cohn, Price, Holman & Stern

[57] ABSTRACT

Arc discharge lamps driven at frequencies in excess of 20 kHz may exhibit the phenomenon of 'acoustic resonance' in which longitudinal and lateral acoustic waves are supported in the arc tube. This is a problem because the acoustic wave may give rise to an instability in the discharge arc, causing it to stretch or gyrate and invariably to extinguish. In some cases damage may be caused to the arc tube. A power supply suitable for an arc discharge lamp comprises a drive circuit arranged to supply voltage to the lamp and control means for causing a characteristic of the voltage to vary, with time, in accordance with a pseudo random sequence in order to reduce, or eliminate, acoustic resonance in the lamp.

10 Claims, 4 Drawing Sheets

POWER SUPPLY

This invention relates to a power supply and it relates especially, though not exclusively, to a power supply suitable for an arc discharge lamp.

An arc discharge lamp is usually driven at a frequency well above the flicker threshold of the human eye in order to facilitate an overall reduction in component size associated with the ballast, and typically a frequency in excess of 20kHz is used. It is well known, however, that an arc tube can support longitudinal and lateral acoustic waves at these relatively high frequencies and this phenomenon, which is commonly referred to as "acoustic resonance", can occur whenever power is supplied to the lamp at, or about, certain resonant frequencies $F_M$ which are related to lamp geometry by the expression $$F_M = \frac{MV}{2L},$$

where M is an integer representing harmonic number,
L is related to the length of the arc tube,
and V is the acoustic velocity in the arc tube.

In general, an arc discharge lamp may exhibit many such resonant frequencies and since M, L and V may all depend on the operating characteristics of the lamp, these frequencies can vary over the running time, and lifetime of the lamp.

Acoustic resonance has proved to be particularly problematical since the acoustic wave may give rise to an instability in the discharge arc, causing it to stretch or gyrate and invariably to extinguish. In some cases damage may be caused to the arc tube.

The problem of acoustic resonance has taxed workers in the field for many years. Solutions which have been proposed include shaping the supply waveform, specially configuring the arc tube and placing quartz wool inside the arc tube. None of the solutions yet proposed appears to have been altogether successful and, in some cases, the proposed solution could conflict with other lamp design considerations such as lamp life, efficacy etc.

SUMMARY OF INVENTION

It is therefore an object of the present invention to provide a power supply suitable for an arc discharge lamp which at least alleviates some of the problems outlined hereinbefore.

Accordingly there is provided a power supply suitable for an arc discharge lamp, the power supply comprising a drive circuit arranged to supply voltage to the lamp and control means for causing a characteristic of said voltage to vary with time in accordance with a pseudo random sequence in order to reduce, or eliminate, acoustic resonance in the lamp.

The voltage supplied to the lamp comprises a spread spectrum signal in which power is spread over a band of frequencies, and the inventor has found that the resulting lamp operation is substantially free from acoustic resonance.

In an embodiment of the invention said drive means and said control means cooperate to supply a succession of voltage pulses to the lamp, each pulse being of a duration selected in accordance with said pseudo random sequence. In another embodiment of the invention said drive means and said control means cooperate to supply said voltage at a succession of frequencies within a pre-determined bandwidth, the frequencies in said succession being selected in accordance with said pseudo random sequence.

It will be understood that each frequency in said succession of frequencies may occur once only or, alternatively, each frequency may occur more than once.

Said control means may include a frequency generator comprising a pseudo-random sequence generator operating in association with a frequency dividing means, and the pseudo random sequence generator may be of the well known simple, or alternatively modular, shift register generator. It will be understood that other types of pseudo random sequence generator could be used and, by application of appropriate code sequence design, their operation may be arranged to generate different linear and non-linear sequences.

In an alternative arrangement in accordance with the invention said control means may comprise means for storing a preselected pseudo random sequence of numbers and a frequency dividing circuit effective to translate said pseudo random sequence of numbers into said pseudo random sequence of frequencies.

In these circumstances, said control means may include means for routing said preselected pseudo random sequence of numbers repeatedly to said frequency dividing means. Said storage means may comprise a plurality of storage locations each containing a respective one of said preselected pseudo random sequence of numbers said storage locations being addressable successively in accordance with a cyclical operation.

Said control means may further include means for regulating the number of cycles at each of said succession of frequencies.

BRIEF DESCRIPTION OF DRAWINGS

In order that the invention may be carried into effect specific embodiments thereof are now described, by way of example only, by reference to the accompanying drawings of which.

DESCRIPTION OF PREFERRED EMBODIMENTS

Figure 1:
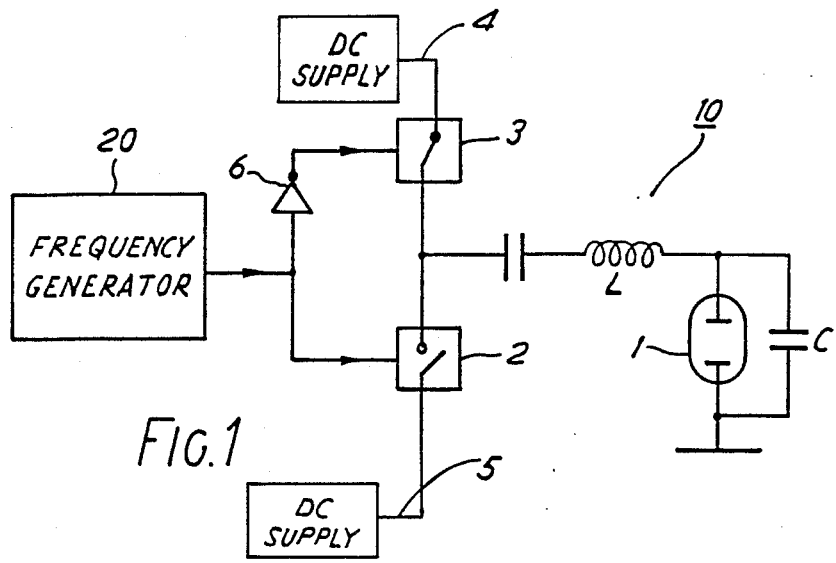
FIG. 1 illustrates a power supply including a drive circuit having a half-bridge configuration.

FIG. 1 of the drawings illustrates a power supply which is designed to drive a high pressure arc discharge lamp (e.g. a metal halide HID lamp), represented generally at 1.

The supply includes a drive circuit, referenced generally at 10, which comprises two, individually energizable, solid state switching devices, in the form of two field effect transistors 2, 3, connected in series across D.C. supply rails 4, 5. In this embodiment of the invention the switching devices are controlled by a frequency generator 20 which is arranged to supply to the drive circuit a train of square wave pulses at a succession of frequencies. One of the switching devices (e.g. 2) is rendered conductive whenever the output of the frequency generator goes high, whereas the other switching device (eg 3), which is connected to the frequency generator via an inverter circuit 6, is rendered conductive whenever the output of the generator goes low. Thus, in operation of the power supply circuit, the two switching devices are effective to couple the supply rails 4, 5 alternately to one end only of the lamp. As is conventional, the power supply circuit includes an LC ballast circuit which can be driven at, or close to, its resonant frequency in order to ignite the lamp. Typically, using an inductance L of 650 µH and a capacitance C of 200nF it is possible to generate an ignition voltage as high as 2.5kV by driving the lamp at a frequency close to the resonant frequency 51KHz. Once the lamp has ignited its electrical resistance falls and so a substantially lower drive frequency, typically in the range 20–40 kHz, may then be used.

Figure 2:
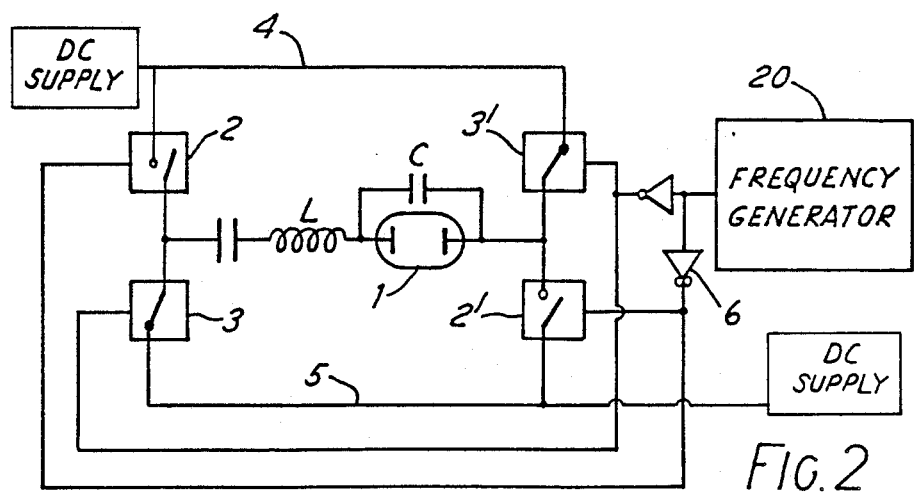
FIG. 2 illustrates a power supply including a drive circuit having a full bridge configuration.

FIG. 1 illustrates a power supply circuit having a so-called "half bridge" configuration, whereas FIG. 2 shows an alternative form of power supply circuit having a "full bridge" configuration. In this case frequency generator 20 controls respective pairs of switching devices (2,2', 3,3') which are arranged to couple the supply rails alternately to opposite ends of the lamp. It will be apparent to workers in the field that other circuit configurations, suitable for supplying DC or AC power to the lamp, could be used.

In this embodiment, frequency generator 20 is designed to generate a succession of frequencies —so called "spot" or "hop" frequencies —which are selected in accordance with a pseudo random sequence and, to this end, the frequency generator incorporates a pseudo-random sequence generator.

Figure 3A:
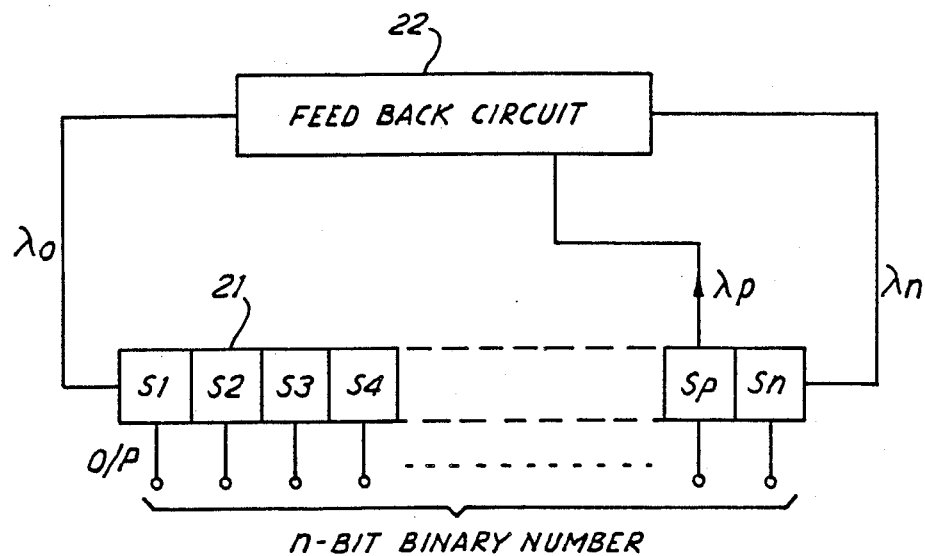
FIGS. 3a and 3b illustrate different forms of pseudo random sequence generator which can be used in the power supply of FIGS. 1 and 2.

FIG. 3a illustrates, by way of example, one form of sequence generator, known as the "simple shift register generator" (SSRG) which comprises an n-stage shift register 21 operating in conjuction with a feedback circuit 22. The shift register generates successively $2^n-1$, n-bit binary numbers with the $n^{th}$-bit, represented as λn, being combined in the feedback circuit with one or more bits, λp say, derived from a selected one, or selected ones, of the shift register stages thereby to create a feedback bit represented as λo. In the case of n = 8, the sequence generator produces 255, 8-bit, binary numbers successively, in pseudo random order, at the output ports 0/P of the shift register stages (S1,S2 . . . S8).

Figure 3B:
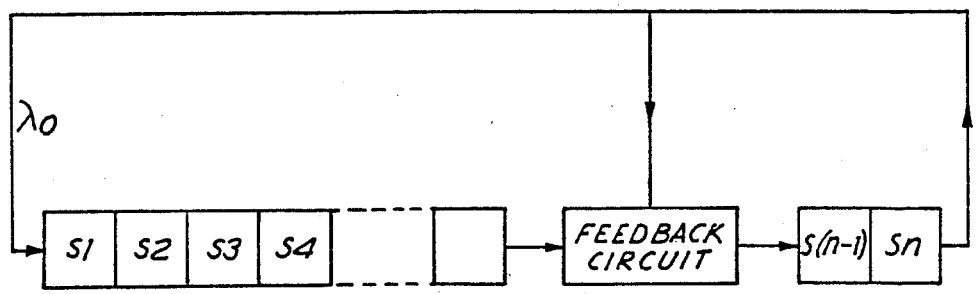

It will be appreciated that the feedback bit may be evaluated using any one of a large number of different coding formats known to those skilled in the art. Moreover, it will be understood that the random sequence generator illustrated in FIG. 3a is presented by way of example only. Other known configurations of random sequence generator could be alternatively used and one such, known as the "modular shift register generator" (MSRG), is shown in FIG. 3b.

The frequency generator 20 operates to translate a pseudo-random sequence of m integers, 1 to $2^n-1$, produced by the sequence generator, into a corresponding pseudo-random sequence of m frequencies spanning a desired frequency range from $f_1 \ldots f_2$. This is accomplished by dividing a relatively large fixed frequency $f_c$ by m successive integers, $n_2 + p$, where p is the current integer generated by the pseudo random sequence generator and $n_2$ is an offset integer defining the upper bound $f_2$ of the desired frequency range i.e.

$$f_2 = \frac{f_c}{n_2}$$

It can be shown that $$f_c \geq \frac{m f_1 f_2}{f_2 - f_1}$$

and, in a typical example, m = 255, $f_1$ = 20 kHz and $f_2$ = 24kHz. In these circumstances the fixed frequency $f_c$ should be at least 30.6MHz, and, in practice, a frequency of 32MHz has been used.

Figure 4:
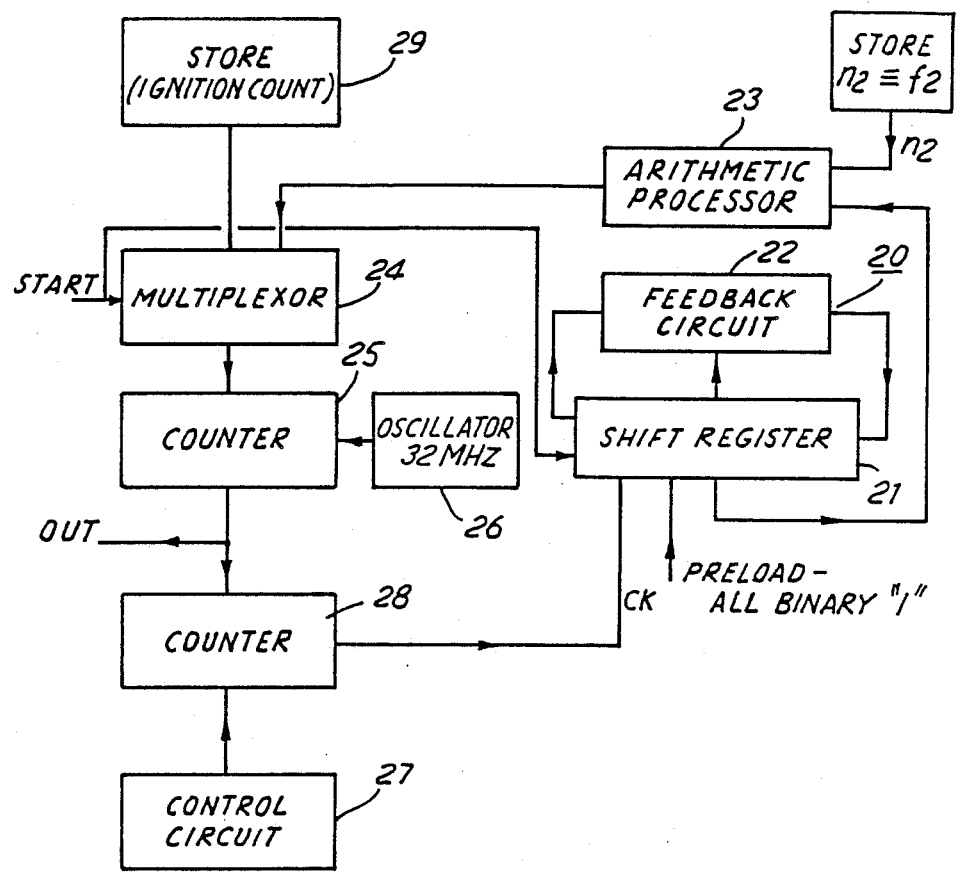
FIG. 4 illustrates a frequency generator used in one embodiment of the invention.

The pseudo random frequency generator illustrated, in block schematic form, in FIG. 4 includes a pseudo random sequence generator 20 comprising a shift register 21 and a feedback circuit 22, as described hereinbefore by reference to FIG. 3a. An eight bit binary number produced by the sequence generator is passed to an arithmetic processor 23 where it is added to an offset number $n_2$ defining the desired, upper frequency bound $f_2$. The resulting sum is then routed, via a multiplexor 24, to a first counter 25 which is arranged to count pulses at a fixed frequency produced by a 32MHz oscillator 26. When the count value and the sum are equal the first counter produces an output pulse and is reset. In effect, therefore, the first counter divides the fixed. 32 MHz frequency by an appropriate factor to generate, at an output (OUT), a drive signal for the lamp at a frequency which lies within a desired frequency band and corresponds to the current value of an integer produced by sequence generator 20.

A pre-conditioned control circuit 27 determines the number of cycles produced at each of the frequencies in the pseudo-random sequence and a second counter 28, which is arranged to monitor the output of the first counter 25, routes a clock pulse CK to shift register 21 of sequence generator 20 when the required number of cycles has been detected. Each clock pulse CK initiates generation of the next number in the pseudo-random sequence.

It will be appreciated that the number of cycles generated need not necessarily be the same for each of the frequencies in the pseudo random sequence. Indeed, the number of cycles generated at each frequency may be tailored to suit a particular lamp and or mode of operation.

In order to ignite the lamp, multiplexer 24 is conditioned to route a predetermined ignition count value from a store 29 to the first counting circuit 25. As before, circuit 25 is arranged to count a required number of fixed frequency pulses produced by oscillator 26, the ignition count value being chosen to correspond to a single ignition frequency, and the control circuit 27 being conditioned to ensure that the number of ignition cycles produced is sufficient to cause ignition of the lamp.

Figure 5:
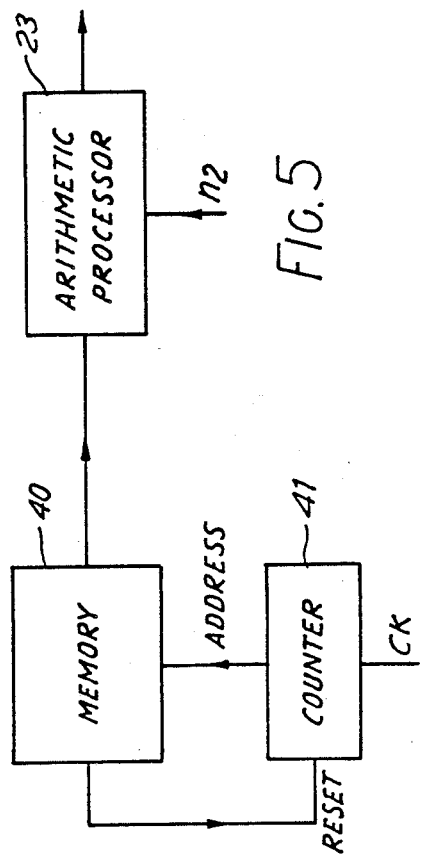
FIG. 5 illustrates a memory circuit replacing a pseudo-random sequence generator of FIG. 4.

In an alternative embodiment of the invention, pseudo random sequence generator 20 of FIG. 4 is replaced by a memory-based circuit of the form shown generally in FIG. 5.

With this arrangement, a preselected pseudo-random sequence of integers is stored in a memory 40, successive integers in the sequence being accessed, in turn, to the arithmetic processor 23 of FIG. 4. To this end, a further counting circuit 41 is arranged to address a respective storage location of memory 40 in response to each succeeding clock pulse produced by counting circuit 28. At the end of the sequence counting circuit 41 is reset and the same sequence is repeated.

It will be understood that a pseudo-random sequence of frequencies produced as described hereinbefore may, if desired contain a frequency more than once and in this way the spectral density of the drive signal can be tailored to suit a particular lamp configuration.

Figure 6:
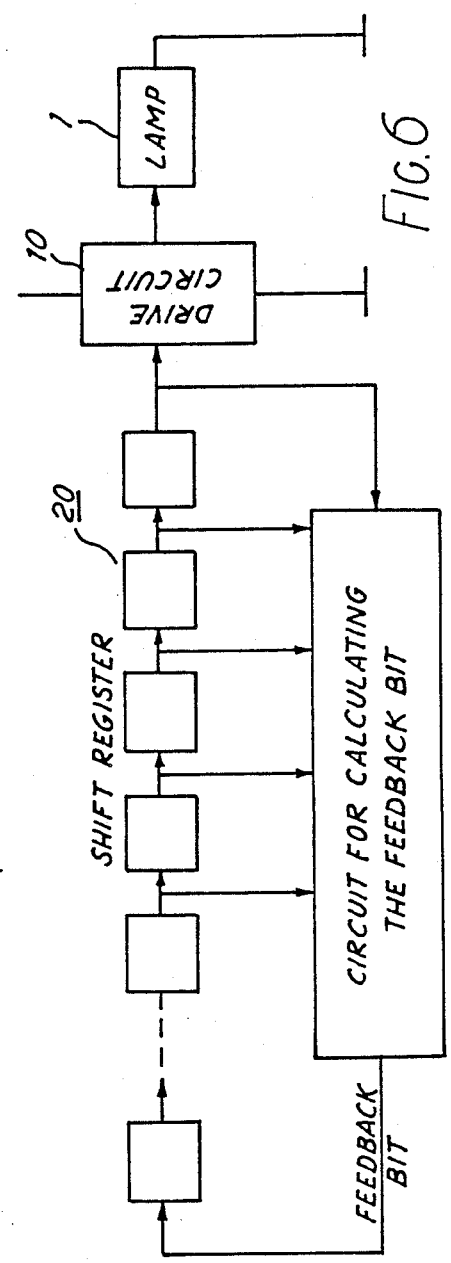
FIG. 6 illustrates a power supply in accordance with another embodiment of the invention.

In a yet further embodiment of the invention, illustrated in FIG. 6, a pseudo random sequence generator 10 of the kind described by reference to FIG. 3a is arranged to produce a pseudo random sequence of binary bits —a direct sequence —which is routed directly to a drive circuit of the kind referenced at 10 in FIG. 1 for example and, in response, the drive circuit supplies a succession of voltage pulses to the lamp each being of a duration selected in accordance with the pseudo-random sequence. Again, it would alternatively be possible to employ a memory-based circuitry including a memory for storing said pseudo random binary sequence.

It will be appreciated that a power supply in accordance with the present invention, whether it be configured to operate using a succession of "spot frequencies", as described by reference to FIGS. 1 to 5, or using a "direct sequence", as described by reference to FIG. 6, supplies to the lamp a spread spectrum signal in which the power is spread over a band of frequencies, and the inventor has found that the resulting lamp operation is substantially free from acoustic resonance.

While the circuitry described hereinbefore may be embodied in hard-wired form, the circuitry could alternatively be embodied using known VLSI techniques. Moreover, the inventor envisages that the components of the power supply (including the ignition circuitry, if desired) could all be fabricated on a single chip. Clearly a silicon-based power supply, being relatively light weight and compact, would present considerable advantages over hitherto known circuitry.

It will be appreciated that a power supply in accordance with the present invention could also be used to supply power to other electrically driven apparatus requiring a high frequency supply.

I claim:

1. A power supply suitable for an arc discharge lamp, the power supply comprising a drive circuit arranged to supply voltage to the lamp and control means for causing a characteristic of said voltage to vary, with time, in accordance with a pseudo-random sequence in order to reduce, or eliminate, acoustic resonance in the lamp.

2. A power supply according to claim 1 wherein said drive means and said control means cooperate to supply a succession of voltage pulses to the lamp, each pulse being of a duration selected in accordance with said pseudo random sequence.

3. A power supply according to claim 1 wherein said drive means and said control means cooperate to supply said voltage at a succession of frequencies, within a predetermined bandwidth, the frequencies in said succession being selected in accordance with said pseudo-random sequence.

4. A power supply according to claim 3 wherein said control means includes a frequency generator comprising a pseudo random sequence generator operating in association with a frequency dividing means.

5. A power supply according to claim 4 wherein said pseudo random sequence generator comprises a simple shift register generator.

6. A power supply according to claim 4 wherein said pseudo random sequence generator comprises a modular shift register generator.

7. A power supply according to claim 3 wherein said control means comprises means for storing a preselected, pseudo random sequence of numbers and a frequency dividing circuit effective to translate said pseudo random sequence of numbers into said pseudo random sequence of frequencies.

8. A power supply according to claim 7 wherein said control means include means for routing said preselected, pseudo random sequence of numbers repeatedly to said frequency dividing means.

9. A power supply according to claim 8 wherein said storage means comprises a plurality of storage locations each containing a respective one of said preselected, pseudo random sequence of numbers, said storage locations being addressable successively, in accordance with a cyclical operation.

10. A power supply according to claim 3 including further means for regulating the number of cycles at each of said successive frequencies.

* * * * *